(12) United States Patent
Martin et al.

(10) Patent No.: US 8,006,714 B1
(45) Date of Patent: Aug. 30, 2011

(54) AUTOMATIC FLOW SHUT-OFF SYSTEM

(76) Inventors: James B. Martin, Granbury, TX (US); Lloyd G. Jones, Granbury, TX (US)

( * ) Notice: Subject to any disclaimer, the term of this patent is extended or adjusted under 35 U.S.C. 154(b) by 270 days.

(21) Appl. No.: 12/462,356

(22) Filed: Aug. 3, 2009

Related U.S. Application Data

(63) Continuation-in-part of application No. 12/229,172, filed on Aug. 20, 2008.

(51) Int. Cl.
*F16K 17/36* (2006.01)
*D06F 39/08* (2006.01)

(52) U.S. Cl. ......... 137/312; 137/67; 137/68.11; 251/74; 251/67; 122/504; 122/507; 122/14.3

(58) Field of Classification Search .................. 137/312, 137/67, 68.11; 251/74, 73, 67; 122/504, 122/507, 14.3
See application file for complete search history.

(56) References Cited

U.S. PATENT DOCUMENTS

| | | | |
|---|---|---|---|
| 2,798,503 A | | 7/1957 | Carver et al. |
| 3,920,031 A * | | 11/1975 | Maxfield ........................ 137/67 |
| 4,305,420 A | | 12/1981 | Nussorf |
| 4,381,710 A * | | 5/1983 | Watterback ................... 102/200 |
| 4,696,319 A | | 9/1987 | Gant |
| 4,930,934 A | | 6/1990 | Adkins |
| 5,771,916 A * | | 6/1998 | Armenia et al. ................ 137/67 |
| 6,024,116 A * | | 2/2000 | Almberg et al. .............. 137/312 |
| 6,117,311 A | | 9/2000 | Stockhowe et al. |
| 6,253,785 B1 * | | 7/2001 | Shumake et al. ............. 137/312 |
| 6,254,823 B1 | | 7/2001 | Rees |
| 6,336,469 B1 | | 1/2002 | Nixon et al. |
| 6,354,322 B2 | | 3/2002 | Clark |
| 6,543,471 B1 * | | 4/2003 | Carroll .......................... 137/312 |
| 6,792,967 B1 * | | 9/2004 | Franklin ....................... 137/312 |
| 6,810,902 B2 * | | 11/2004 | Bootka ......................... 137/312 |
| 6,895,990 B1 * | | 5/2005 | Carroll .......................... 137/312 |
| 6,899,122 B1 * | | 5/2005 | Mele ............................. 137/312 |
| 7,424,896 B1 * | | 9/2008 | Martin et al. ................. 137/312 |
| 7,562,673 B1 * | | 7/2009 | Martin et al. ................. 137/312 |
| 7,665,482 B2 * | | 2/2010 | McLean ....................... 137/420 |
| 7,703,476 B1 * | | 4/2010 | Carroll .......................... 137/421 |
| 2004/0081804 A1 * | | 4/2004 | Basler et al. ................. 428/174 |

* cited by examiner

*Primary Examiner* — John Rivell
*Assistant Examiner* — Minh Le
(74) *Attorney, Agent, or Firm* — Drude Faulconer

(57) ABSTRACT

An automatic flow shut-off unit for shutting off water to an appliance (e.g. commode) when a leak or overflow occurs. The unit includes an outer housing having a ball valve mounted thereon wherein the valve is connected between the water supply and the appliance. A tripper unit is mounted in the outer housing and has a plunger therein. The valve is connected to the plunger by a length of actuation material (e.g. flexible cable). A compression spring is positioned in the tripper unit to normally bias the plunger downwards. A cartridge having a water reactive material (e.g. commercially-available toilet paper) thereon is removably mounted in the outer housing wherein the water reactive material when dry supports the plunger in a cocked position but which will quickly weaken and disintegrate upon contact with water.

14 Claims, 3 Drawing Sheets

AUTOMATIC FLOW SHUT-OFF SYSTEM

CROSS-REFERENCE TO EARLIER APPLICATION

The present application is a Continuation-in-Part of pending application U.S. Ser. No. 12/229,172, filed Aug. 20, 2008.

DESCRIPTION

1. Technical Field

The present invention relates to an automatic flow shut-off system and more particularly relates to a system for automatically shutting off the water to an appliance (e.g. commode, hot water heater, washer, etc.) when the appliance ruptures or springs a leak.

2. Background of the Invention

Almost everyone is familiar with the problems caused by unexpected leaks or overflows in household or commercial appliances such as commodes, hot water heaters, and the like. For example, if a commode becomes plugged or has a defective flush system, the tank or stool can overflow thereby causing substantial damage to the floor and surrounding area before the water can be turned off.

The same type of situation may exist when the tank of a hot water heater cracks or springs a leak which goes undetected for any period of time. That is, water will continuously flow into the leaking tank and out onto the floor until the leak is detected and the water is cut off. If the owner is away on vacation or does not promptly become aware of the leak or rupture, the premises quickly floods which, in turn, can cause extensive damage to the affected floors, rugs, etc. Sometimes, the floor surfaces and adjacent furniture are damaged to the extent that they have to be replaced which can be both very expensive and depressing. Further, washing machines, ice makers, etc. can develop leaks which, if not quickly discovered, can cause similar damage. Unfortunately, damage caused by such flooding may not be covered under some standard homeowner's insurance policies so the costs for such damages in those instances must be borne solely by the owner.

The possibility of undetected leaks occurring in such appliances has been long recognized and several different approaches have been proposed for addressing this problem. For example; see U.S. Pat. Nos. 2,798,503; 3,920,031; 4,305,420; 5,771,916; 6,024,116; 6,253,785 B1; 6,336,469 B1; 6,543,471 B1; and 6,354,322 B2; all of which disclose systems for shutting off the water supply if a leak should occur. While these references disclose workable solutions, each require at least one of the following: (1) a pan or tray to collect the water; (2) connections for electrical power; and/or (3) the extensive modification to the supply line(s) thereby making the initial cost and installation relatively expensive for a "do-it-yourselfer" who wishes to retro-fit an already installed appliance.

Accordingly, a need exists for an inexpensive, automatic flow shut-off system which can easily be retro-fitted into most installed, modern household or commercial appliances (i.e. commodes, etc.) by a person with only minimal plumbing skills. Recently, automatic flow shut-off systems have been purposed which meets these requirements; see U.S. Pat. No. 7,424,896 B1, issued Sep. 16, 2009 and U.S. Pat. No. 7,562,673, issued Jul. 21, 2009 and co-pending U.S. application Ser. No. 12/229,172, filed Aug. 20, 2008. The present invention is a still further improvement in such flow cut-off systems.

SUMMARY OF THE INVENTION

The present invention provides an automatic flow shut-off unit for quickly shutting off the water to an appliance (e.g. commode) upon the occurrence of a leak or overflow at the appliance. The unit of the present invention requires no pan or electricity for its operation and requires no complicated plumbing for its installation and can easily be reset and reused after each operation.

More specially, the unit of the present invention is comprised of an outer housing which is adapted to be positioned in proximity of the appliance and secured thereto by hook tape or the like. The outer housing is open at the bottom and has openings around its lower perimeter to allow any water that may surrounding the appliance to enter into the housing. A cover closes the upper end of the outer housing and has a shut-off valve (e.g. ball valve) mounted thereon. The valve is one which is rotated 90° between an open and a closed position by an arm secured to the valve.

The valve has an inlet which is adapted to be connected to a water supply line and an outlet adapted to be connected to the appliance and when in an open position allows the flow of water from the supply line to the appliance. A tripper unit is mounted in the outer housing and has an inner housing open at its lower end and closed at its upper end by a cap. A plunger extends through the inner housing and extends out through an opening in the cap. A stop is mounted on the plunger and a compression spring is positioned between the underside of the cap and the stop on the plunger. An actuation member (e.g. length of flexible material, e.g. cord, chain) connects the arm on the shut-off valve to the plunger.

A cartridge is releasably locked in the lower end of the outer housing and has a water reactive material thereon. Preferably, this material is comprised of any water-dissolvable material (e.g. commercially-available toilet tissue paper, paper towels, etc.) which is strong enough to resist the movement of the spring-biased plunger when the material is dry, but which will quickly weaken and disintegrate upon contact with water.

The plunger is cocked and held against the bias of the spring by the water reactive material on the cartridge. When the appliance overflows or leaks onto the floor, the water will flow into the housing and into contact with the water-reactive material on the cartridge. In a very short period of time, the material on the cartridge will weaken and/or disintegrate thereby allowing the compressed spring to force the plunger rapidly downward in the housing.

As the plunger moves downward, it pulls the actuation member downward which, in turn, rotates shut-off valve to its closed position, thereby shutting off the flow of water to the appliance. As will be recognized, this can prevent significant damage to the areas surrounding and in proximity of the appliance. Once the problem has been corrected, the cartridge can easily be removed and refitted with new water reactive material for reuse in the unit or a new cartridge can be used to reset the automatic shut-off unit.

BRIEF DESCRIPTION OF THE DRAWINGS

The actual construction operation, and apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DESCRIPTION OF THE PREFERRED EMBODIMENTS

Figure 1:
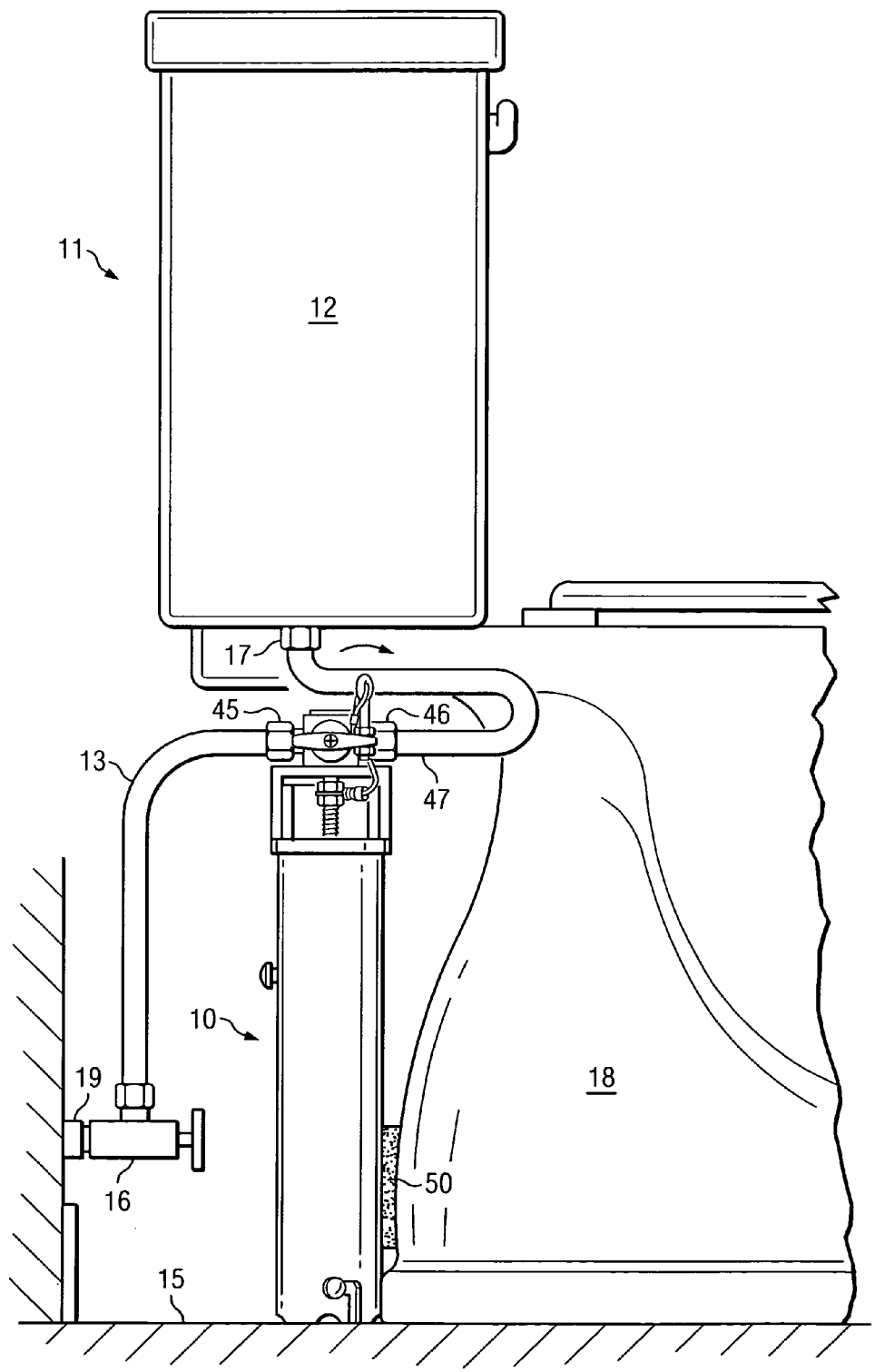
FIG. 1 is a perspective side view, partly in section, of a typical commode having the automatic flow shut-off system of the present invention installed thereon.

Referring more particularly to the drawings, FIG. 1 illustrates the automatic flow shut-off unit 10 of the present invention when used with a commode 11. Commode 11 is positioned on a substantially horizontal floor 15. In most commode installations, the tank 12 of the commode 11 is directly connected to a water supply 19 by a line (not shown) which extends from a shut-off valve 16 in supply 19 to a connector 17 on tank 12. As will be understood, valve 16 is provided in most standard installations to shut off the water in an emergency situation or when servicing or replacing the commode. While the valve is very useful in such situations, the response time in locating and closing valve 16 when the commode malfunctions may be too long to prevent serious damage and/or unpleasantness Also, the shut-off valve, itself, when accessed, may be difficult and time consuming to close due to long periods of nonuse.

In the present invention, the automatic shut-off unit 10 is adapted to be positioned on floor 15 adjacent the commode 11 (preferably at the rear thereof) so that it will instantly detect any water that might accumulate at that point. That is, if the bowl 18 of commode 11 should overflow, shut-off unit 10 senses the water as it reaches floor 15 and automatically shuts off the flow of water to tank 12 as will be described below.

Figure 2:
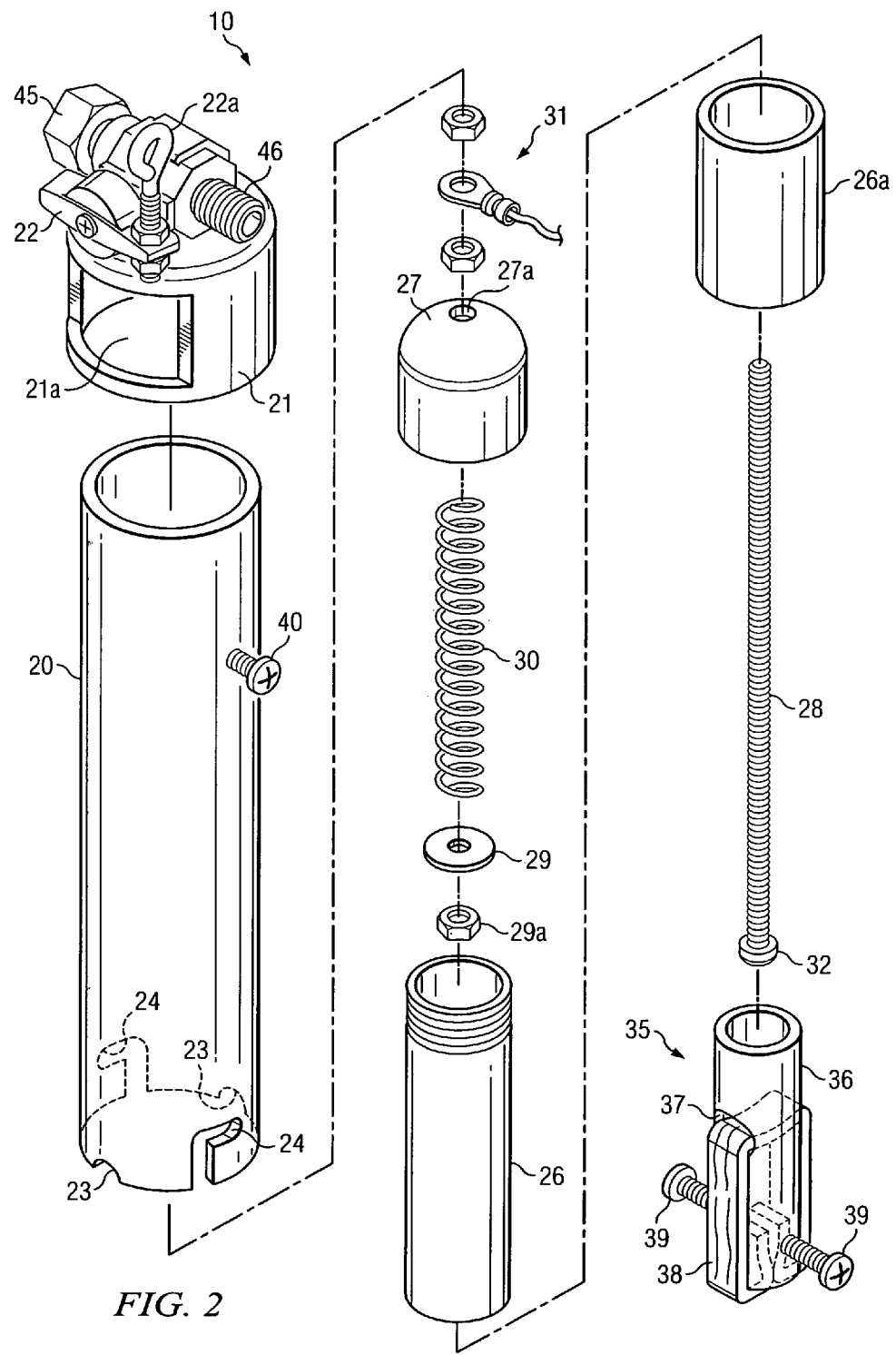
FIG. 2 is an enlarged, exploded view of the automatic flow shut-off system shown in FIG. 1
Figure 3:
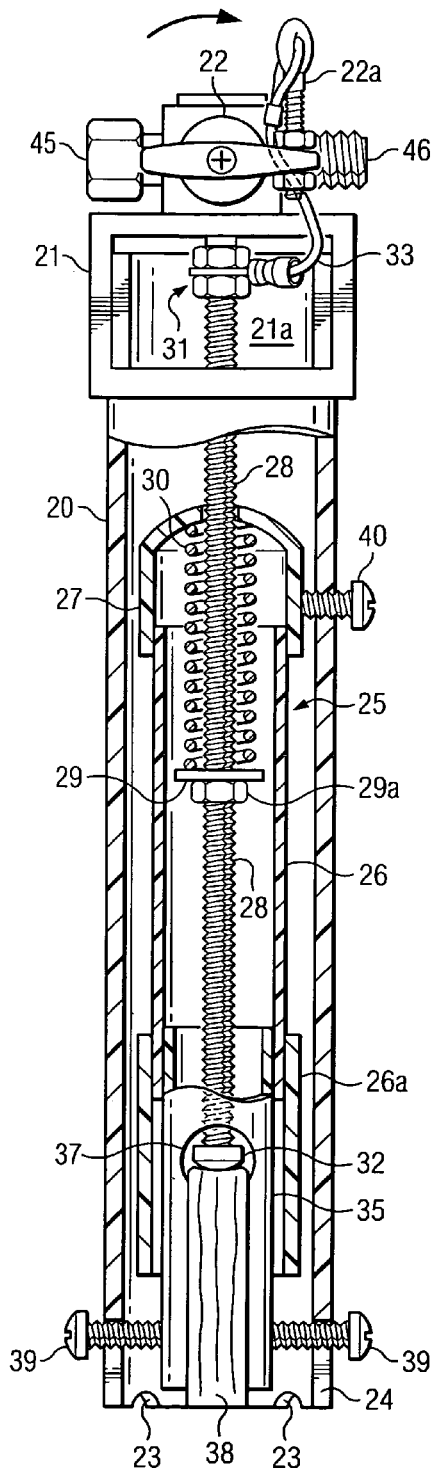
FIG. 3 is an enlarged, exploded view of the automatic flow shut-off system shown in FIG. 1 when in a cocked or open position.
Figure 4:
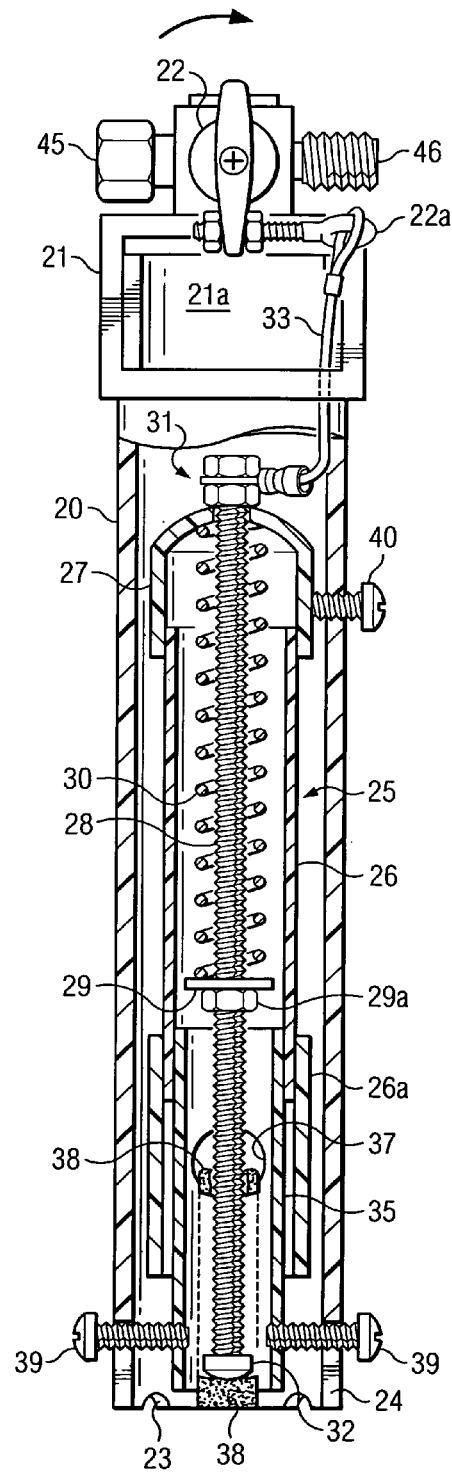
FIG. 4 is an enlarged, exploded view of the automatic flow shut-off system shown in FIG. 1 when in a tripped or closed position.

Referring now to FIGS. 2-4, the details of the automatic shut-off unit 10 will now be set forth. While it should be understood that the components of unit 10 may be constructed from any appropriate material (e.g. metal, other plastics, etc.), preferably they are made of readily-available PVC or like materials.

Basically, unit 10 is comprised of an outer housing 20; open at it lower end and closed at its upper end by cover 21 which has a window 21a therein. Cover 21 is secured to housing 20 by any appropriate means, e.g. friction fit, glue, threads, etc.) and has valve 22 firmly fixed to its upper surface by any appropriate means, e.g. screws, clamps, etc. Valve 22 is a ball valve which can be opened or closed upon 90° rotation, as will be understood in the art, and has an operating arm 22a attached thereto for rotating said valve as will be explained below. Outer housing has a plurality of small openings or weep holes 23 around the bottom periphery thereof to allow the entry of water into the housing 20. Housing 20 also has a pair of diametrically-opposed "bayonet or J-type" slots 24 at its lower end for a purpose to described later.

Nested inside of housing 20 is tripper unit 25 which, in turn, is comprised of inner housing 26 which is open at its lower end and closed at its upper end by cap 27. Centralizer or spacer 26a is fitted onto the lower portion of inner housing 25 to help stabilize inner housing 25 within outer housing 20. Spacer 26a can be merely friction fitted onto inner housing 25 or can be more permanently secured thereto by any appropriate means, e.g. glue, threads, etc.

Plunger 28 (e.g. threaded bolt) extends through inner housing 25 and out through an opening 27a (FIG. 2) in cap 27. Plunger 28 has a stop 29 affixed along its length by a nut 29a or the like. When tripper unit is assembled, a spring 30 is positioned within inner housing 26, between the lower surface of cap 27 and stop 29 on plunger 28 for a purpose described below. A connector means 31 is provided at the upper end of plunger for connecting the plunger 28 to operating arm 22a on valve 22 by means of a flexible line 33 (FIGS. 3, 4) or the like when inner housing 25 is in its operable position within outer housing 20. A foot 32 (e.g. nut) is provided on the lower end of plunger 28.

A removable cartridge 35, which nests within the lower end of outer housing 20, is comprised of a relatively short length of tubing 36 (PVC pipe or the like) having a transverse opening 37 through its wall along the length thereof. A water reactive material 38 which will quickly begin to weaken and disintegrate once it comes into contact with water is loaded onto cartridge 35 through the transverse opening 37. The water reactive material is preferably comprised of an absorbent paper 38 (e.g. common "paper towels", toilet tissue, etc.) but may also include other similar materials (e.g. soluble starch-based materials such as that used in "packing peanuts" and the like).

The water reactive material 38 must be of a sufficient strength to provide the resistive force necessary to keep tripping unit 25 from "tripping" as long as the material 38 remains dry. Common, commercially-available paper towels or toilet tissue paper work well when cut into strips and then passed through transverse opening 37, around the length and the lower end of the cartridge (see 35 in FIG. 2) to "wrap" the cartridge 35. More than one ply or layer of the water reactive material may have to be wrapped onto the cartridge 35 to provide the thickness necessary to support the plunger 28 in its cocked or un-tripped position (i.e. against the bias of spring 30), as will be explained below. It should be understood that cartridge 35 can be factory prepared and sold as a replacement part or a user can easily remove a used cartridge, rewrap it with the water reactive material, and replace it when necessary thereby making the tripper unit instantly reusable. For easy removal and replacement, cartridge has a pair of lugs (e.g. screws 39) thereon which cooperate with bayonet slots 24 on outer housing 20 to hold the cartridge in place.

In operation, automatic shut-off unit 10 is assembled by first assembling tripper unit 25. This is accomplished by securing stop 29 in position on plunger 28, placing spring 30 on top of stop 29 and then passing the upper end of plunger 28 through opening 27a in cap 27 which, in turn, is secured onto the top of inner housing 26. Spring 30 will be retained between the underside of cap 27 and stop 29 on plunger 28. Means 31 is secured to the upper end of plunger 28. Foot 32 is fixed to the lower end of plunger 28 and spacer 26a is positioned onto inner housing 26.

The assembled tripper unit 25 is then inserted into outer housing 20 through the open bottom thereof. Tripper unit 25 is fixed within outer housing 20 by any appropriate means, e.g. set screw 40. Plunger 28 is pushed upward within inner housing 26. As plunger 28 moves upward, stop 29 on the plunger compresses spring 30. Cartridge 35, with the required water reactive material in place, is inserted into the bottom of outer housing 20 so that foot 32 on the cocked plunger rest on the water reactive material 38 of cartridge 35 which is locked in place by lugs 39 within slots 24, thereby locking the unit 10 in a cocked or un-tripped position (see FIG. 3).

When in the cocked or un-tripped position (FIG. 3), foot 32 on plunger 28 rests on water reactive material 38 which, in turn, holds plunger in the cocked position and prevents downward movement of the plunger. Valve 22 on cover 21 is moved to an open position and an actuation member 33 is connected at one end to connection means 31 on plunger 28 and passes through window 21a in cover 21 where the other end is connected to the operating arm 22a on valve 22. The length of member 33 is sized so that it will be taut when automatic shut-off unit is in its cocked position. Preferably, this member is flexible (e.g. small diameter, wound steel cable; cord, chain, or the like) but could be a rigid linkage (e.g. metal or plastic rod, flat link, or the like).

Once automatic shut-off unit 10 is assembled in its cocked position (FIG. 3), it can then be installed into an standard commode 11 (FIG. 1). As will be understood in the art, a standard shut-off valve 16 (FIG. 1) is typically provided in supply line 19 to shut off the water to the commode, if a need arises. However, in some instances, a leak or overflow of the commode can occur that can cause damage or unpleasantness before valve 16 can be manually actuated. To install unit 10, the unit 10 is placed in a substantially vertical position on floor 15 adjacent stool 18 and outer housing 20 is secured thereto by any appropriate means (e.g. hook tape 50).

The original water supply line 13 (as shown in FIG. 1) is disconnected from the connection 17 on the tank 12 of the commode and is reconnected to the inlet 45 of valve 22 on unit 16. A flexible flow line 47 or the like connects outlet 46 of valve 22 to the connection 17 on tank 12. Depending on a particular commode model or type and/or the particular installation involved, original line 13 or line 47 may be used for one of the required connections (e.g. 13 or 47) while a new line (e.g. 47 or 13) is provided for the other connection. In some installations, new lines may be required for both connections, as will be recognized in the art. Since unit 10 is in a cocked position, the valve 22 remains open and water flows to tank 12 in the same manner as before unit 10 was installed.

Again, a water absorbent paper (e.g. common "paper towels") is preferred as the water reactive material 38 since this material is both inexpensive and readily available. The absorbent paper, once wrapped onto the cartridge 38, as described above, is of a sufficient thickness to provide the resistive force necessary to keep the unit from "tripping" as long as the paper remains dry.

If and when commode 11 should leak water for any reason, e.g. bowl overflows due to clogging, the water accumulates on floor 15 and flows through openings 23 in outer housing 20 and into contact with the water reactive material 38 on cartridge 35. The water will immediately begin to react with material (i.e. wick upward into all of the layers of the absorbent paper). which, in turn, begins to weaken and disintegrate. Once the water sufficiently weakens the paper, compressed spring 30, acting on stop 29, drives plunger 28 downward with substantial force.

As the plunger rapidly moves downward in inner housing 26 and cartridge 35, it pulls the actuation member 33 downward which, in turn, rotates arm 22a to move valve 22 to its closed position (see FIG. 4). This shuts-off the flow of water to tank 12 thereby preventing any further flow to tank 12 thereby saving water and preventing overflow onto floor 15. As an example of how quick the tripper unit 16 will respond, it has been found that it takes only approximately 1 minute or less for tripper unit 25 to trip once water which has accumulated only to a depth of ⅛ inch or less on floor 15.

Once the emergency has passed and the problem with the commode has been fixed, automatic shut-off unit 10 can easily be reset by quickly removing the spent or "tripped" cartridge 35 from the lower end of inner housing 26 and either replacing it with a new one or merely rewrapping the used cartridge with new water reactive material 38. Again, plunger 28 is moved upward in inner housing 26 as the cartridge is moved into the lower end of the inner housing. Cartridge 35 is locked in place within outer housing 20 by cooperating lugs 39 and slots 24. With foot 32 resting on the new water reactive material 38, plunger 28 will again be in its cocked position against the bias of compressed spring 30. Valve 22 is manually moved to its open position which moves arm 22a back to its original cocked position which, in turn, again tensions the actuation member 33 and unit 10 is now ready for use.

While automatic shut-off unit 10 has been illustrated in association with a standard-type commode, it should be realized that unit 10 can be used to shut off the flow of water to other water-using appliances; e.g. hot water heaters, ice makers, washers, etc. In such installations, the line between the existing shut off valve in water supply line is connected to the inlet 45 of valve 22 on unit 10 and a new line is used to connect the outlet 46 of valve 22 to the appliance. Depending on the spacing and layout of the original plumbing, it may be necessary to use all new lines (e.g. longer in length) for connecting the unit 10 into the water supply to the appliance. However, once installed, unit 10 acts exactly as described above to shut off the flow of water to the appliance when a leak or overflow develops in the appliance.

What is claimed is:

1. An automatic flow shut-off unit for shutting off the flow of water to an appliance when a leak develops at said appliance; said shut-off unit comprising:
    an outer housing, adapted to be positioned on a surface adjacent said appliance when in an operable position, said housing being positioned to allow the flow of water from said surface into said housing;
    a shut-off valve attached to the upper end of said outer housing, said valve having an open position to allow flow therethrough and a closed position to shut-off flow therethrough; said valve having an inlet adapted to be connected to a water supply line and an outlet adapted to be connected to said appliance;
    a cartridge mounted in the lower end of said outer housing, said cartridge having a water reactive material thereon which will disintegrate when contacted by water; and
    a tripper unit mounted within said outer housing; said tripper unit comprising:
        an inner housing mounted within said outer housing and above said cartridge;
        a plunger slidably positioned within said inner housing, said plunger having an upper end extending out through the upper end of said inner housing and a lower end resting on said water reactive material on said cartridge when said tripper unit is in its cocked position;
        bias means within said inner housing and adapted to normally bias said plunger downward in said inner housing when said tripper unit is in its cocked or un-tripped position; and
    an actuation means connecting said upper end of said plunger to said shut-off valve whereby said valve will be moved to its said closed position when said plunger moves downward in said inner housing.

2. The automatic flow shut-off system of claim 1 including:
    a cover secured to the top of said outer housing; and
    wherein said shut-off valve.

3. The automatic flow shut-off system of claim 1 wherein said tripper unit is removable through the lower end of said outer housing.

4. The automatic flow shut-off system of claim 1 wherein said water reactive material forming said cartridge comprises:
    an absorbent paper material.

5. The automatic flow shut-off system of claim 4 wherein said water reactive material forming said cartridge comprises:
    commercially-available toilet tissue paper.

6. The automatic flow shut-off system of claim 1 including means for removably mounting said cartridge in said outer housing.

7. The automatic flow shut-off system of claim 6 wherein said means for removably mounting said cartridge includes:
- lugs on said cartridge; and
- slots formed in the lower end of said outer housing, said slots adapted to receive said lugs on said cartridge for locking said cartridge within said outer housing.

8. The automatic flow shut-off system of claim 1 including:
- means on said outer housing for securing said outer housing to said appliance.

9. The automatic flow shut-off system of claim 8 wherein said means for securing said housing comprises:
- hook tape.

10. The automatic flow shut-off system of claim 6 including:
- a cap closing the top of said inner housing and having an opening through which said upper end of said plunger passes;

and wherein said bias means comprises:
- a stop affixed to said plunger;
- a compression spring positioned between the underside of said cap and said stop.

11. The automatic flow shut-off system of claim 10 wherein said valve comprises:
- a ball valve which is rotatable 90° between said open and said closed positions.

12. The automatic flow shut-off system of claim 11 wherein said actuation means comprises:
- an arm attached to said valve for moving said valve between said open position and said closed position; and
- an actuation member connecting said top of said plunger to said arm.

13. The automatic flow shut-off system of claim 12 wherein said actuation member comprises:
- a length of a flexible material.

14. The automatic flow shut-off system of claim 1 wherein said appliance is a commode.

* * * * *